United States Patent
Nakamura et al.

(10) Patent No.: US 8,441,661 B2
(45) Date of Patent: May 14, 2013

(54) IMAGE PROCESSING APPARATUS WITH POWER CONTROL UNIT

(75) Inventors: Rie Nakamura, Kanagawa (JP); Yoshifumi Kawai, Kanagawa (JP); Masateru Kumagai, Kanagawa (JP); Shinsuke Yanazume, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 115 days.

(21) Appl. No.: 13/034,337

(22) Filed: Feb. 24, 2011

(65) Prior Publication Data
US 2011/0222101 A1 Sep. 15, 2011

(30) Foreign Application Priority Data
Mar. 10, 2010 (JP) .................................. 2010-052644

(51) Int. Cl.
*G06K 15/00* (2006.01)
(52) U.S. Cl.
USPC ............................... 358/1.14; 714/14; 714/24
(58) Field of Classification Search ........... 713/300–340
See application file for complete search history.

(56) References Cited

U.S. PATENT DOCUMENTS
2008/0055667 A1 3/2008 Baba
2010/0250988 A1* 9/2010 Okuda et al. .................. 713/323

FOREIGN PATENT DOCUMENTS
| JP | 2006-511100 | 3/2006 |
| JP | 2008-065479 | 3/2008 |
| JP | 2009-110437 | 5/2009 |
| WO | WO 2004/028182 | 4/2004 |

* cited by examiner

*Primary Examiner* — Benny Q Tieu
*Assistant Examiner* — Marcellus Augustin
(74) *Attorney, Agent, or Firm* — IPUSA, PLLC (57) ABSTRACT

An image processing apparatus includes a platform and plugins installed in the platform to cause devices to perform functions, wherein the platform includes a power control unit to control supply of power to the devices and a first power control interface to transmit to the plugins an advanced notice of shutdown, wherein each of the plugins includes a second power control interface to receive the advanced notice of shutdown and a power processing control unit to make a preparation for shutdown in response to the advanced notice of shutdown received through the second power control interface, and to send information about the preparation to the power control unit through the second power control interface, wherein the power control unit controls supply of power to at least one of the devices based on the information about the preparation received from at least one of the plugins.

6 Claims, 10 Drawing Sheets

IMAGE PROCESSING APPARATUS WITH POWER CONTROL UNIT

BACKGROUND OF THE INVENTION

1. Field of the Invention

The disclosures herein generally relate to image processing apparatuses, and particularly relate to an image processing apparatus that has plural plugins installed in a platform to achieve respective functions, and that safely turns off the power

2. Description of the Related Art

In recent years, it has been desired to improve a software development environment for image processing apparatuses such as printers, multifunctional machines, and facsimile machines in response to increases in their complexity and functionality. As a result, a plugin may be installed in a platform to add a single function or a small number of functions. Such an arrangement may provide a highly functional image processing apparatus (see Japanese Patent Application Publication No. 2009-110457).

The main power of an image processing apparatus may inadvertently be turned off while various processes are being performed. This may result in malfunction or data loss. In consideration of this, generally, power-switch control is performed to prevent the power switch from being tuned off while there is an ongoing job.

The conventional technology for power-switch control simply ensures that the power switch be not turned off during job execution. With such an arrangement, a user can never turn off the power switch during job execution despite the fact that there may be some circumstances in which the user wishes to turn off the power. In such a case, the user may resort to pull out the power plug since he/she cannot turn off the power switch. When this happens, the image processing apparatus may suffer significant damage. In consideration of this, there may be a need to improve the usability of an image processing apparatus while preventing the image processing apparatus from suffering trouble caused by the switching off of the power switch. Especially when plural plugins are installed, it is desirable to provide a solution to the above-noted problems associated with power-off by taking into account influences on these plugins.

Accordingly, there may be a need to provide an image processing apparatus that can perform safe power control by stopping main power supply after completing the execution of device functions performed by plugins.

SUMMARY OF THE INVENTION

It is a general object of at least one embodiment of the present invention to provide an image processing apparatus that substantially eliminates one or more problems caused by the limitations and disadvantages of the related art.

In one embodiment, an image processing apparatus includes a platform serving as a basis for operations and a plurality of plugins installed in the platform in an uninstallable manner to cause a plurality of devices to perform functions. The platform includes a power control unit to control supply of power to the devices and a first power control interface to transmit to the plugins an advanced notice of shutdown that is to be performed by the power control unit. Each of the plugins includes a second power control interface to receive the advanced notice of shutdown from the first power control interface and a power processing control unit to make a preparation for shutdown in response to the advanced notice of shutdown received through the second power control interface, and to send information about the preparation to the power control unit through the second power control interface. The power control unit controls supply of power to at least one of the devices based on the information about the preparation received from at least one of the plugins.

According to at least one embodiment, an image processing apparatus can perform safe power control by stopping main power supply after completing the execution of device functions performed by plugins.

BRIEF DESCRIPTION OF THE DRAWINGS

Other objects and further features of embodiments will be apparent from the following detailed description when read in conjunction with the accompanying drawings, in which.

DESCRIPTION OF THE PREFERRED EMBODIMENTS

In the following, embodiments of the present invention will be described with reference to the accompanying drawings.

In the following, preferred embodiments of the present invention will be described with reference to the accompanying drawings. The embodiments described in the following may include various limitations that may be preferable from the technological point of view. The following descriptions, however, are never intended to be limiting, and particular elements of the disclosed embodiments are not considered to be essential for the purpose of the invention.

Embodiment 1

Figure 1:
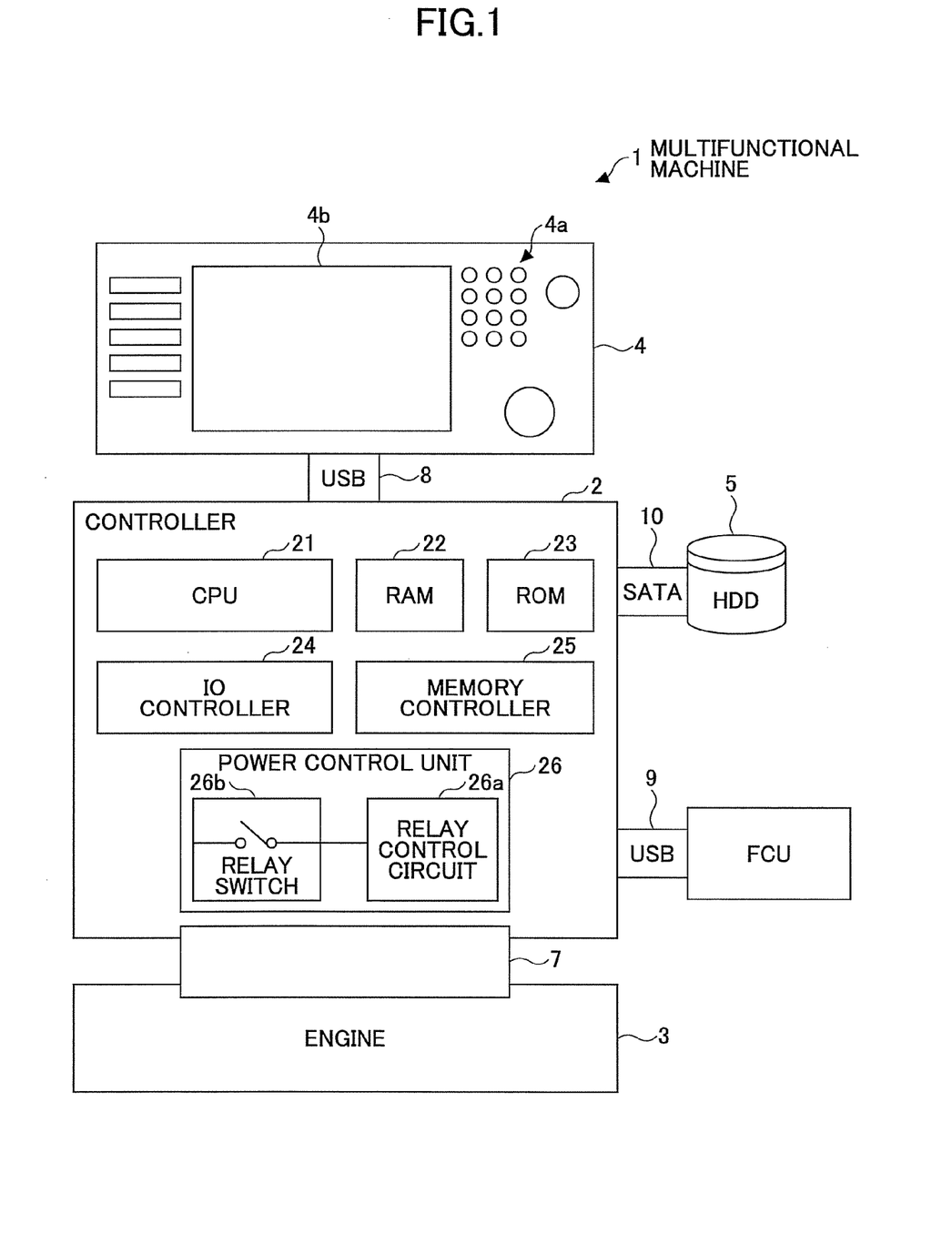
FIG. 1 is a block diagram of a multifunctional machine according to an embodiment.

FIG. 1 through FIG. 10 are drawings illustrating an embodiment of an image processing apparatus. FIG. 1 is a block diagram of a multifunctional machine that is an embodiment of an image processing apparatus.

In FIG. 1, a multifunctional machine 1 includes a controller 2 serving as a platform, an engine 3, an operation unit 4, a hard disc drive 5, and an FCU (facsimile control unit) 6. The engine 3, the operation unit 4, the hard disc drive 5, and the FCU 6 may perform functions added by plugins. The controller 2 and the engine 3 are connected through a PCIe bus 7. The controller 2, the operation unit 4, and the FCU 6 are connected through a USB (Universal Serial Bus) 8 and a USB 9. The controller 2 and the hard disc drive 5 are connected through a SATA (Serial Advanced Technology Attachment) 10.

The controller 2 includes a CPU (central processing unit) 21, a RAM (random access memory) 22, a ROM (read only memory) 23, an IO controller 24, a memory controller 25, and a power control unit 26.

The ROM 23 stores basic programs for the platform, power control programs, and system data. The CPU 21 controls the controller 2 and plugins of the multifunctional machine 1 based on the programs stored in the ROM 23 by utilizing the RAM 22 as a work memory. In this manner, the CPU 21 performs the functions of the multifunctional machine 1, and also performs a power control procedure which will be described later.

The multifunctional machine 1 reads the power control programs stored in a computer-readable recording medium such as a ROM, an EEPROM (Electrically Erasable and Programmable Read Only Memory), an EPROM, a flash memory, a flexible disc, a CD-ROM (Compact Disc Read Only Memory), a CD-RW (Compact Disc Rewritable), a DVD (Digital Versatile Disk), an SD (Secure Digital) card, or an MO (Magneto-optical Disc) for installment in the ROM 23 or the like. In this manner, the multifunctional machine 1 serving as an image processing apparatus performs a power control method that turns off the main power by causing the plugins to make preparations for shutdown. The power control programs are computer-executable programs written in a legacy programming language or an object-oriented programming language such as an assembler, C, C++, or Java (registered trademark). The power control programs may be distributed through recording media.

The IO controller 24 is connected to various I/O components such as motors, clutches, and sensors in the multifunctional machine 1, and exchanges signals with these I/O components.

The memory controller 25 performs access control with respect to memory devices such as the RAM 22 and the hard disc drive 5.

The power control unit 26 includes a relay control circuit 26a and a relay switch 26b. The relay switch 26b is inserted between a power supply cable for supplying power from a commercial power supply and a power supply unit (not shown). The relay switch 26b supplies or suspends power from the commercial power supply to the power supply unit. The power supply unit generates, from the commercial power supply, voltages and currents suitable to the multifunctional machine 1 for provision to various parts of the multifunctional machine 1. In the power control unit 26, the relay control circuit 26a controls the on/off state of the relay switch 26b even after the main power switch of the multifunctional machine 1 is turned off. With this arrangement, the power control unit 26 controls whether to supply power to the controller 2, the engine 3, the operation unit 4, the hard disc drive 5, and the FCU 6 according to the power control procedure which will be described later.

The engine 3 uses a predetermined print system such as an electrophotographic system or inkjet system to print an image on a sheet (i.e., print medium) based on print data received from the CPU 21. In the case of an electrophotographic system being used, the engine 3 includes components needed to record print data on a sheet according to the electrophotographic system. Such components may include a photoconductive body, an optical write unit, a developing unit, a charging unit, and a cleaning unit. The engine 3 causes the optical write unit to operate based on print data received through the PCIe bus 7 from the controller 2 to form an electrostatic latent image on the photoconductive body. The developing unit supplies toner to the photoconductive body to form a toner image. The engine 3 supplies a paper sheet from a paper feed unit to a space between the photoconductive body and a transfer unit, thereby transferring the toner image from the photoconductive body to the paper sheet. The paper sheet with the toner image transferred thereon is supplied to a fuser unit. The fuser unit applies heat and pressure to cause the toner image to be fused to the paper sheet. The paper sheet is then discharged onto a copy receiving tray attached to the exterior of the multifunctional machine 1.

The multifunctional machine 1 includes a print number counter for counting the number of sheets on which images are formed by an image forming unit, and also includes a discharge number counter for counting the number of sheets discharged onto a copy receiving tray by detecting the sheets discharged onto the copy receiving tray. In the case of an electrophotographic system being used, the print number counter may count the number of sheets for which fusing by the fusing unit is completed.

The operation unit 4 includes various operation keys 4a and a display (e.g., liquid crystal display) 4b used for operating the multifunctional machine 1, and may also include lamps such as LED lamps for indicating the operating conditions of the multifunctional machine 1. The operation keys 4a are operated to enter various operation instructions to use the multifunctional machine 1. The operation unit 4 displays, on the display (i.e., reporting unit) 4b, instructions entered through the operation keys 4a and various types of information presented by the multifunctional machine 1 to an operator. The display 4b may include a touch panel with function buttons displayed thereon, thereby allowing operations to be performed through touch operations.

Image data and other types of data are read from and written to the hard disc drive (i.e., nonvolatile memory unit) 5 having a predetermined storage capacity by the memory controller 25 of the controller 2.

The FCU 6 is connected to a public telephone network. The FCU 6 catches a line, transmits a selection signal indicative of the telephone number of a recipient, and detects an incoming call, thereby performing automatic incoming call processing and automatic outgoing call processing. The FCU 6 exchanges facsimile control signals with a facsimile machine at the other end of the line.

Figure 2:
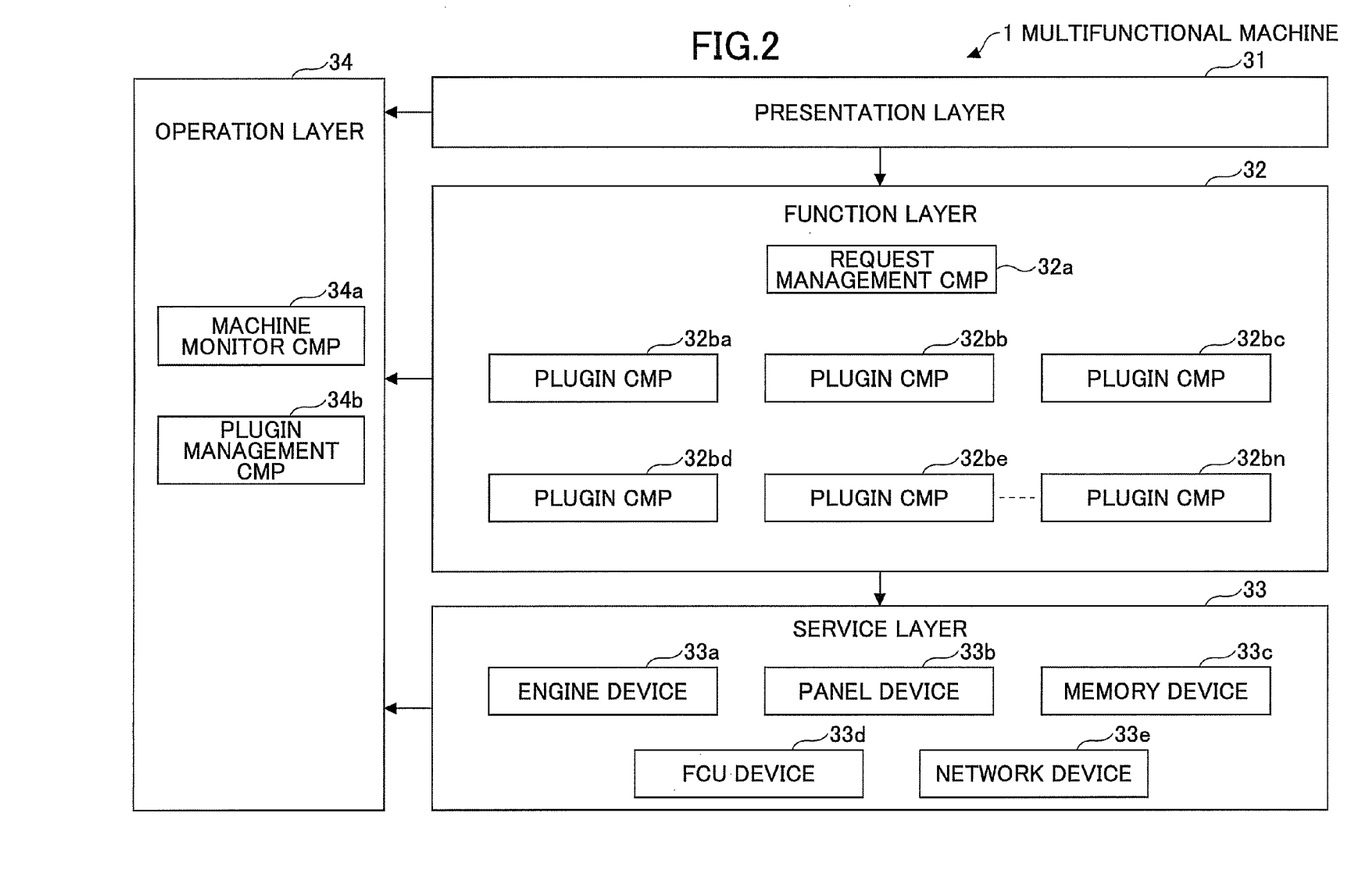
FIG. 2 is a drawing illustrating an example of the software configuration of the multifunctional machine.

The multifunctional machine 1 has a software configuration that includes a presentation layer 31, a function layer 32, a service layer 33, and an operation layer 34 as illustrated in FIG. 2. The presentation layer 31 provides a user interface. The presentation layer 31 may control operation screens for various operations of the multifunctional machine 1 and a power-off transition screen used in the power control procedure. The function layer 32 combines and performs functions to provide components (which may hereinafter be referred to as CMPs). The function layer 32 includes a request management CMP 32a and various plugin CMPs 32ba through 32bn. The service layer 33 serves to provide services used in common by the function layer 32. The service layer 33 includes an engine device 33a, a panel device 33b, a memory device 33c, an FCU device 33d, and a network device 33e. The operation layer 34 includes items relating to the entire system which are difficult to be localized. The operation layer 34 includes a machine monitor CMP 34a and a plugin management CMP 34b.

The plugin management CMP 34b serves to manage and controls the plugin CMPs 32ba through 32bn that may be installed to or uninstalled from the multifunctional machine 1. The machine monitor CMP 34a is a module that arbitrates between devices and components relating to electric power conditions to manage and control the power conditions of the multifunctional machine 1. The machine monitor CMP 34a determines whether to perform shutdown, and performs shutdown based on the determination. The request management CMP 32*a* is a module that manages and controls requests entered into the multifunctional machine 1. The request management CMP 32*a* requests the plugin CMPs 32*ba* through 32*bn* to cancel ongoing jobs at the time of shutdown. The plugin CMPs 32*ba* through 32*bn* are modules which cause devices to perform functions that are installable through plugin installment. Uninstall is also easily performed. The plugin CMPs 32*ba* through 32*bn* are modules that cause devices (i.e., hardware devices) such as the engine 3, the operation unit 4, the hard disc drive 5, and the FCU 6 to perform respective functions. In the following, the plugin CMPs 32*ba* through 32*bn* may collectively or individually be referred to as a plugin CMP 32*b* when there is no need to specify one. The devices 33*a* through 33*e* of the service layer 33 are drivers for the respective devices.

Figure 3:
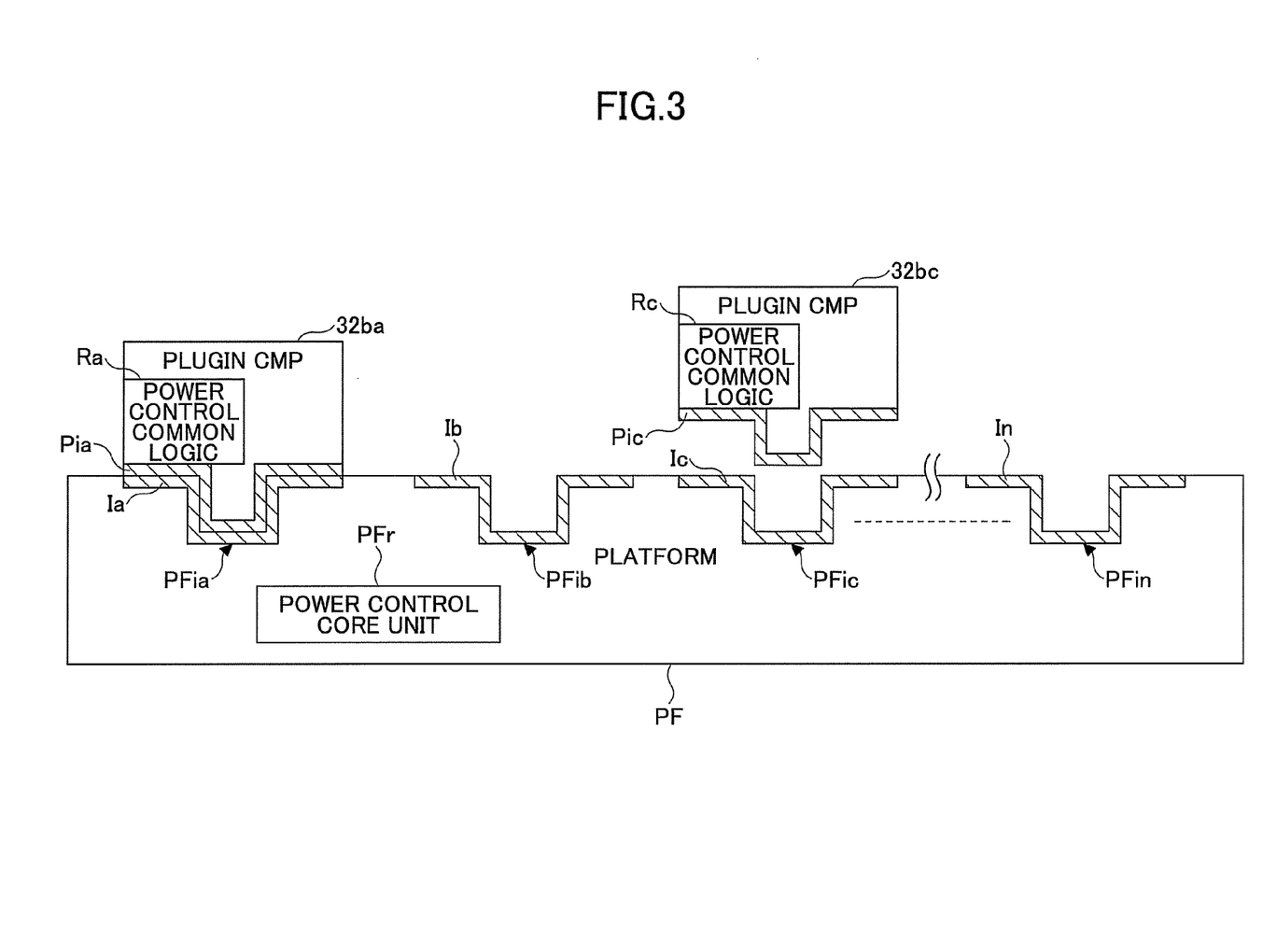
FIG. 3 is a drawing illustrating relationships between a platform and plugins.

As illustrated in FIG. 3, a platform PF of the multifunctional machine includes plugin interfaces PFia through PFin, which correspond to the plugin CMPs 32*ba* through 32*bn*, respectively. The plugin interfaces PFia through PFin include power-related interfaces (power control interfaces) Ia through In, respectively. The platform PF includes a power control core unit PFr for performing power control. The power control core unit (power control unit) PFr performs power-off control at the time of power-off (i.e., power shutdown) in cooperation with the plugin CMPs 32*ba* through 32*bn*.

The plugin CMPs 32*ba* through 32*bn* include power control common logics (i.e., logic components) Ra through Rn and plugin interfaces Pia through Pin, respectively. The plugin interfaces (plugin-side power control interfaces) Pia through Pin exchange information with the plugin interfaces PFia through PFin, respectively. The power control common logics (power processing control units) Ra through Rn are provided with the mechanism to cancel jobs without exception when the main power is to be turned off upon the main power switch being turned off. The power control common logics Ra through Rn work together with the power control core unit PFr, thereby performing shutdown processes appropriate for the respective devices of the plugin CMPs 32*ba* through 32*bn*. Namely, the plugin CMPs 32*ba* through 32*bn* are provided with the power control common logics Ra through Rn, so that power control can be performed for the devices whose functions are executed by the plugin CMPs 32*ba* through 32*bn*, without making additions or modifications to the platform PF upon the addition or removal of the plugin CMPs 32*ba* through 32*bn*.

The power-related interfaces Ia through In request the plugin CMPs 32*ba* through 32*bn* to perform shutdown through the platform PF. Further, the power-related interfaces Ia through In cause the plugin CMPs 32*ba* through 32*bn* to comply with predetermined interfaces when the plugin CMPs 32*ba* through 32*bn* report information about shutdown to the platform PF. This arrangement ensures that power shutdown be properly performed despite the addition of any plugin CMPs 32*ba* through 32*bn*.

In the following, the operation of the present embodiment will be described. The main power switch may be turned off when the plugin CMPs 32*ba* through 32*bn* are incorporated into (i.e., installed in) the platform PF. In such an instance, the power control core unit PFr of the platform PF in the multifunctional machine 1 of the present embodiment cooperates with the plugin CMPs 32*ba* through 32*bn* to turn off the main power supply in a safe manner.

Figure 4:
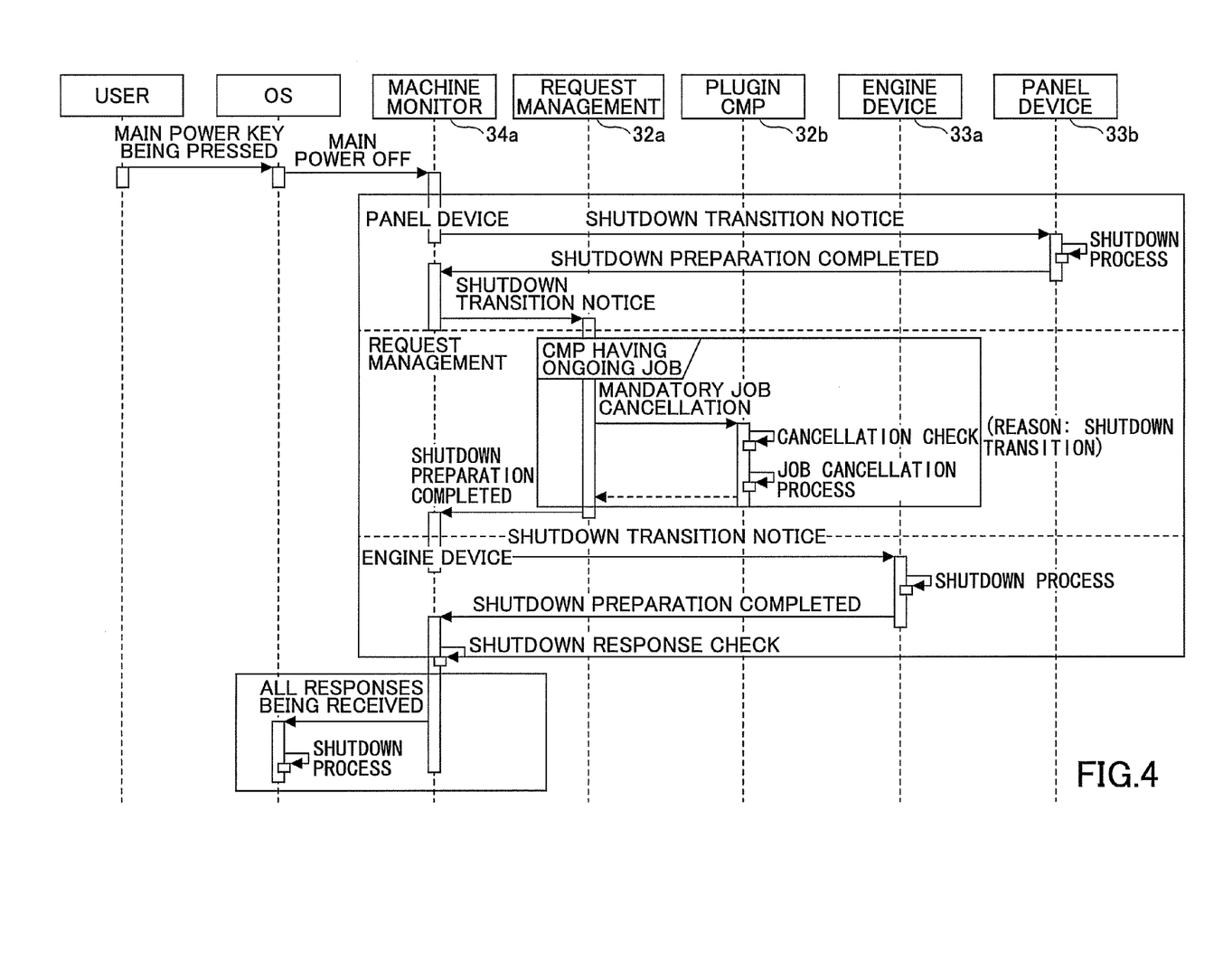
FIG. 4 is a drawing illustrating a power control sequence performed by the multifunctional machine.
Figure 5:
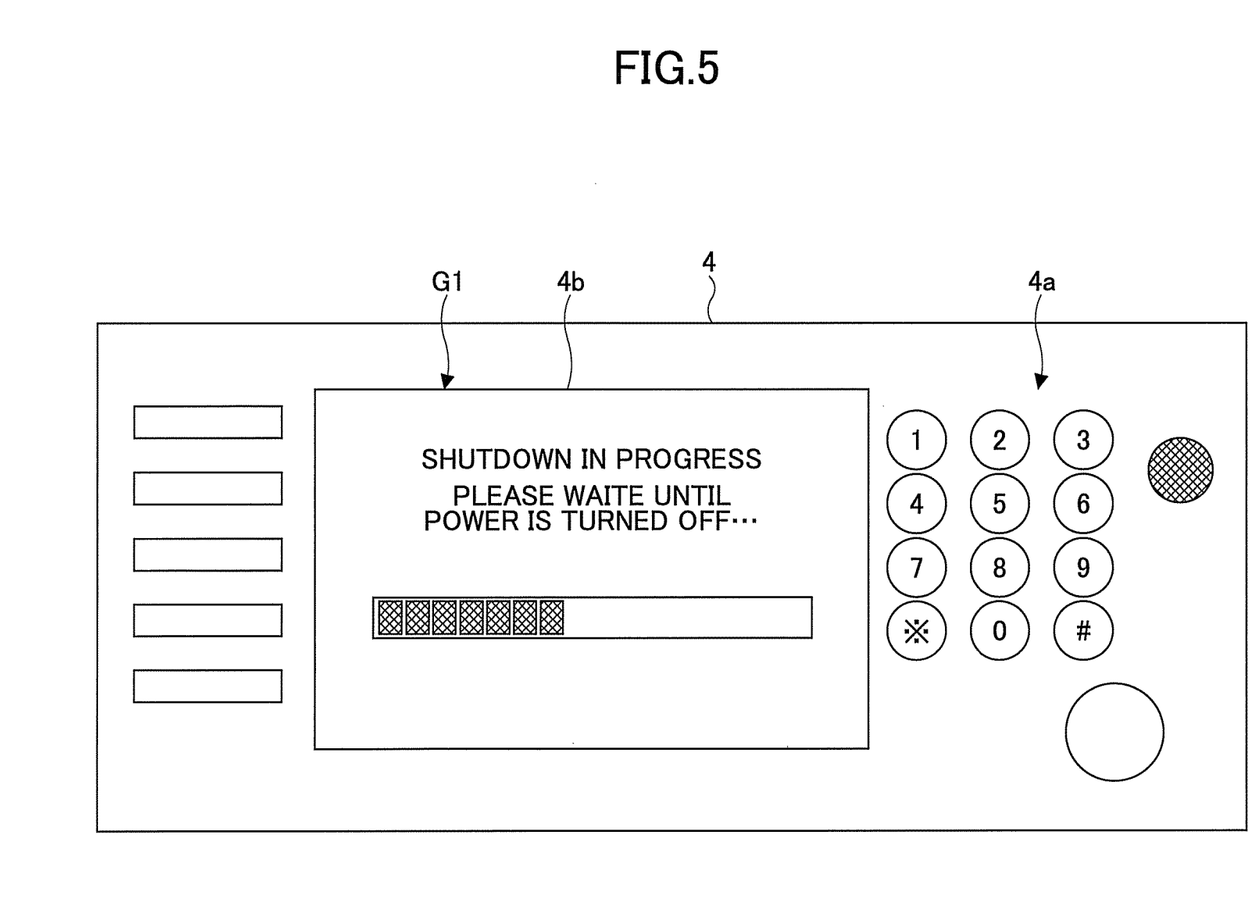
FIG. 5 is a drawing illustrating an example of a display screen indicating an ongoing shutdown process.

Upon a user pressing the main power key to request power-off, the multifunctional machine 1 performs the power control sequence illustrated in FIG. 4. Upon pressing the main power key, an OS in the multifunctional machine 1 recognizes the pressing of the main power key to request the machine monitor CMP 34*a* to turn off the main power (such turning off of the main power may hereinafter be referred to as "shutdown"). The machine monitor CMP 34*a* sends a shutdown transition notice (i.e., an advanced notice of power stoppage) to the panel device 33*b*. Upon receiving the shutdown transition notice, the panel device 33*b* performs a shutdown process (i.e., shutdown preparations). Upon completing the shutdown preparations, the panel device 33*b* sends a shutdown preparation completion notice (i.e., a notice of the completion of shutdown preparations) to the machine monitor CMP 34*a*. In the case of the shutdown process of the panel device 33*b*, the machine monitor CMP 34*a* displays a shutdown-progress indication screen G1 on the display 4*b* of the operation unit 4 to indicate the fact that shutdown is underway and also to indicate the progress of shutdown processes as illustrated in FIG. 5.

Upon receiving the shutdown preparation completion notice from the panel device 33*b*, the machine monitor CMP 34*a* sends a shutdown transition notice to the request management CMP 32*a*. Upon receiving the shutdown transition notice, the request management CMP 32*a* requests the plugin CMPs 32*ba* through 32*bn* having ongoing jobs to cancel these jobs on a mandatory basis. The power control common logics Ra through Rn of the plugin CMPs 32*ba* through 32*bn* check whether cancellation is possible with respect to the jobs of the respective plugin CMPs 32*ba* through 32*bn*. The power control common logics Ra through Rn then perform job-cancellation processes to cancel jobs that can be cancelled.

Upon receiving the shutdown preparation completion notice from all the plugin CMPs 32*ba* through 32*bn*, the machine monitor CMP 34*a* sends a shutdown transition notice to the plugin CMP 32*b* of the engine device 33*a*. The plugin CMP 32*b* of the engine device 33*a* uses its power control common logic R (which is one of the power control common logics Ra through Rn that is implemented in the plugin CMP 32*b* for controlling the operation of the engine device 33*a*) to perform a shutdown process of the engine 3. Upon completing shutdown preparations, the plugin CMP 32*b* sends a shutdown preparation completion notice to the machine monitor CMP 34*a*.

Upon checking shutdown responses and detecting shutdown responses from all the plugin CMPs 32*ba* through 32*bn*, the machine monitor CMP 34*a* sends a notice indicative of receipt of all the shutdown responses to the OS. The OS then uses the power control core unit PFr to control the power control unit 26, so that the relay control circuit 26*a* turns off the relay switch 26*b* to turn off the main power, i.e., to perform shutdown.

Figure 6:
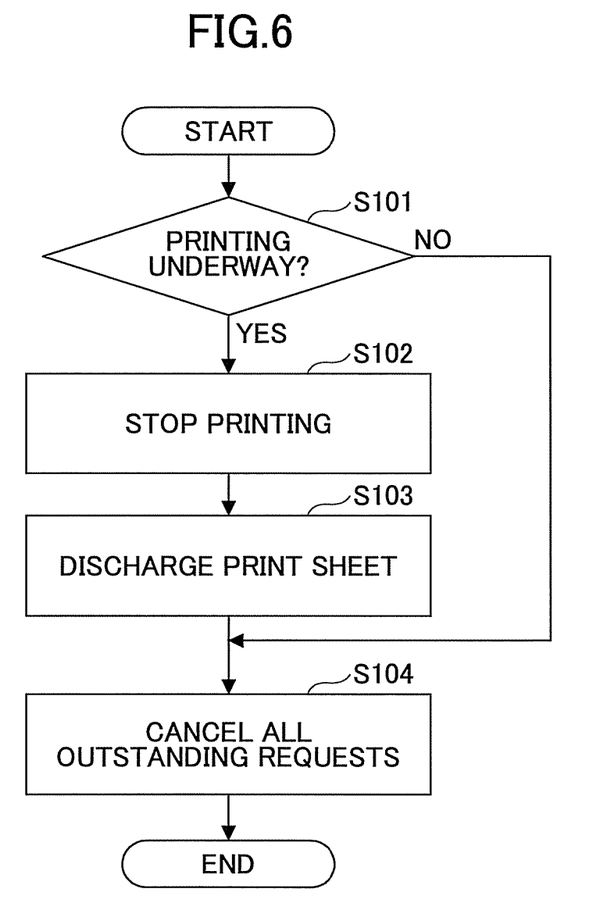
FIG. 6 is a flowchart illustrating a shutdown preparation process for an engine.

For the shutdown preparations made by the engine 3 (i.e., the engine device 33*a*), the engine device 33*a* in the multifunctional machine 1 performs a shutdown process illustrated in FIG. 6. The power control common logic R of the plugin CMP 32*b* for causing the engine device 33*a* to perform a function checks whether printing is underway (step S101). When printing is underway, the power control common logic R stops the print process (step S102), and discharges the sheets that are remaining on the sheet travel path (step S103). Namely, when a fuse-completed sheet is in existence on the sheet travel path of the engine device 33*a* without having been discharged to the copy receiving tray, the power control common logic R discharges the sheet. When there is a sheet on which an image has been transferred but has not been fused, the power control common logic R performs a fusing process on the sheet by use of the fuser unit, followed by discharging the sheet. When a sheet onto which no image has been transferred remains on the sheet travel path between the paper feed tray and the copy receiving tray, the power control common logic R discharges the sheet onto the copy receiving tray, for example, thereby preventing the sheet from remaining on the travel path after the switching off of main power.

Upon discharging sheets, the power control common logic R for the engine device 33a cancels all the outstanding print requests, thereby completing a shutdown preparation process (step S104).

Upon detecting no ongoing print process in step S101, the power control common logic R immediately cancels all the outstanding print requests, thereby completing a shutdown preparation process (step S104).

Figure 7:
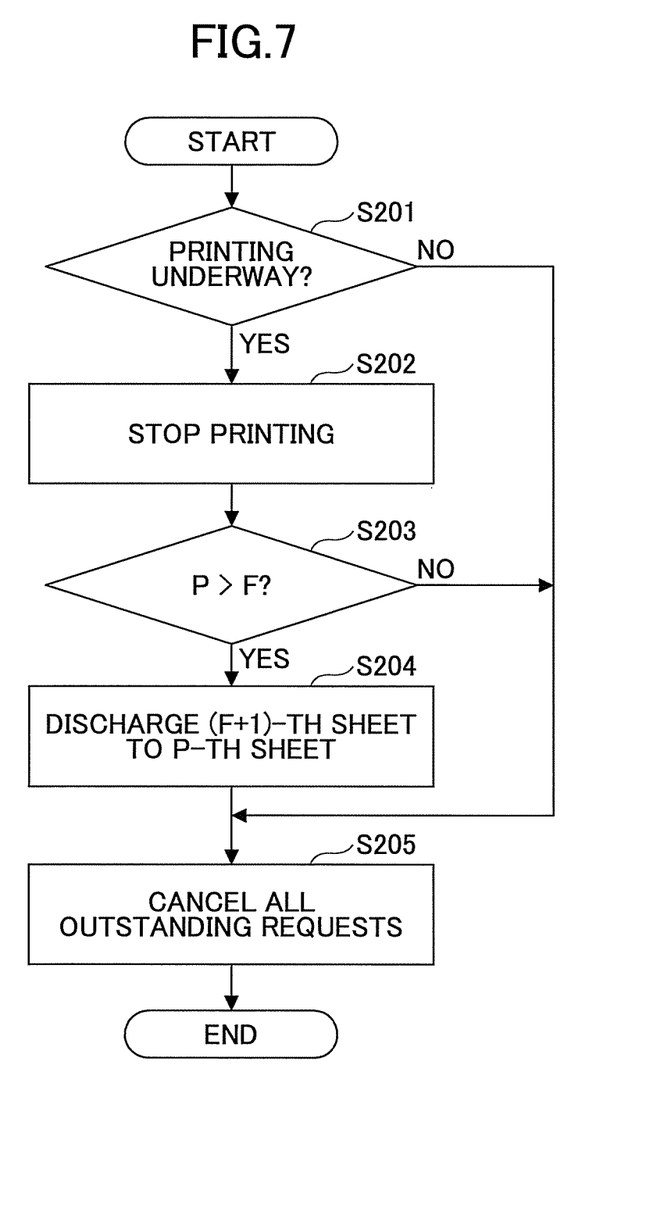
FIG. 7 is a flowchart illustrating another shutdown preparation process for the engine.

For the shutdown preparation process of the engine device 33a, the multifunctional machine 1 may perform a shutdown preparation process illustrated in FIG. 7 in order to ensure that sheets on the sheet travel path be discharged. The power control common logic R of the plugin CMP 32b for the engine device 33a checks whether printing is underway (step S201). In the case of printing being performed, the power control common logic R stops the print process (step S202). The power control common logic R checks whether a fuse-completed sheet number P is larger than a discharged-sheet number F (step S203). The fuse-completed sheet number P is the count value of the fuse-number counter that counts the number of sheets for which fusing is completed, and the discharged-sheet number F is the count value of the discharge-number counter that counts the number of sheets discharged onto the copy receiving tray.

For fee-charge purposes, the multifunctional machine 1 may be provided with the fuse-number counter that counts the number of sheets for which fusing by the fuser unit of the engine 3 is completed thereby to provide the fuse-completed sheet number P, and may also be provided with the discharge-number counter that counts the number of fuse-completed sheets discharged onto the copy receiving tray thereby to provide the discharged-sheet number F. The fact that the fuse-completed sheet number P and the discharged-sheet number F match means that all the sheets counted for fee-charge purposes have already been discharged onto the copy receiving tray, so that these sheets are available for the user to collect. That fact that the fuse-completed sheet number P is larger than the discharged-sheet number F means that some sheets counted for the fee-charge purposes are still remaining on the sheet travel path without having been discharged onto the copy receiving tray. Namely, there are printed sheets that are not yet available to the user.

In consideration of this, the power control common logic R of the plugin CMP 32b for the engine device 33a discharges all the sheets from the sequence number equal to the discharged-sheet number F plus "1" to the sequence number equal to the fuse-completed sheet number P upon detecting that the fuse-completed sheet number P is larger than the discharged-sheet number F. The power control common logic R then cancels all the outstanding print requests, thereby completing a shutdown preparation process (step S205).

Upon detecting that the fuse-completed sheet number P is equal to the discharged-sheet number F in step S203, the power control common logic R ascertains that all the fuse-completed sheets have already been discharged onto the copy receiving tray. In this case, the power control common logic R immediately cancels all the outstanding print requests, thereby completing a shutdown preparation process (step S205).

Upon detecting no ongoing print process in step S201, the power control common logic R cancels all the print requests held by the plugin CMP 32b for the engine device 33a, thereby completing a shutdown preparation process (step S205).

Figure 8:
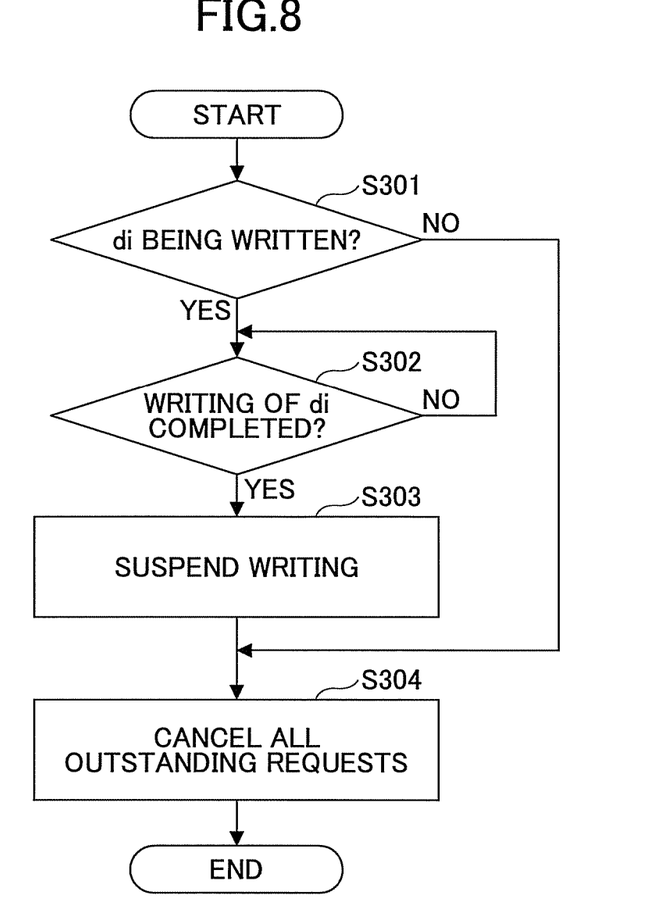
FIG. 8 is a flowchart illustrating a shutdown preparation process for a hard disk drive.

In a shutdown preparation process for the hard disc drive 5 of the multifunctional machine 1, the power control common logic R of the plugin CMP 32b for the memory device 33c checks whether current write data di is being written (step S301). In the case of the data being written, the power control common logic R waits until the writing of the write data di is completed (step S302), and, then, stops the write process (step S303).

Upon stopping the write process, the power control common logic R cancels all the write requests held by the plugin CMP 32b for the memory device 33c, thereby completing a shutdown preparation process (step S304).

Upon detecting that the current write data di is not being written in step S301, the power control common logic R cancels all the write requests held by the plugin CMP 32b for the memory device 33c, thereby completing a shutdown preparation process (step S304).

Figure 9:
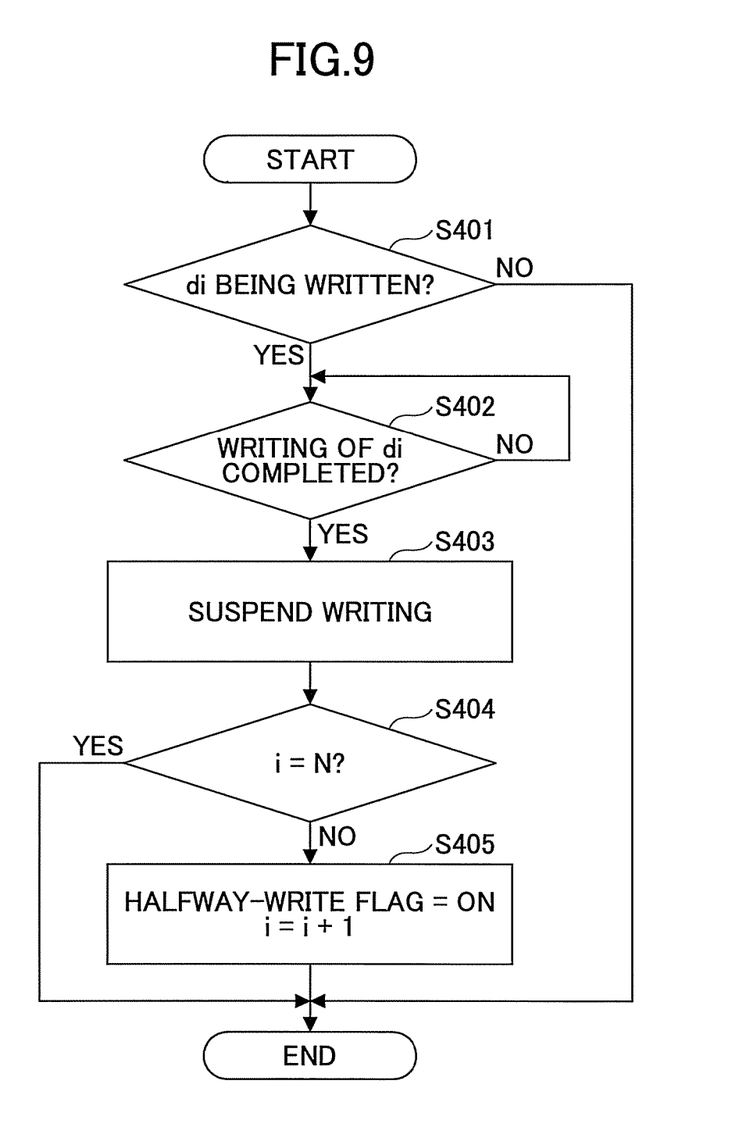
FIG. 9 is a flowchart illustrating another shutdown preparation process for the hard disk drive.
Figure 10:
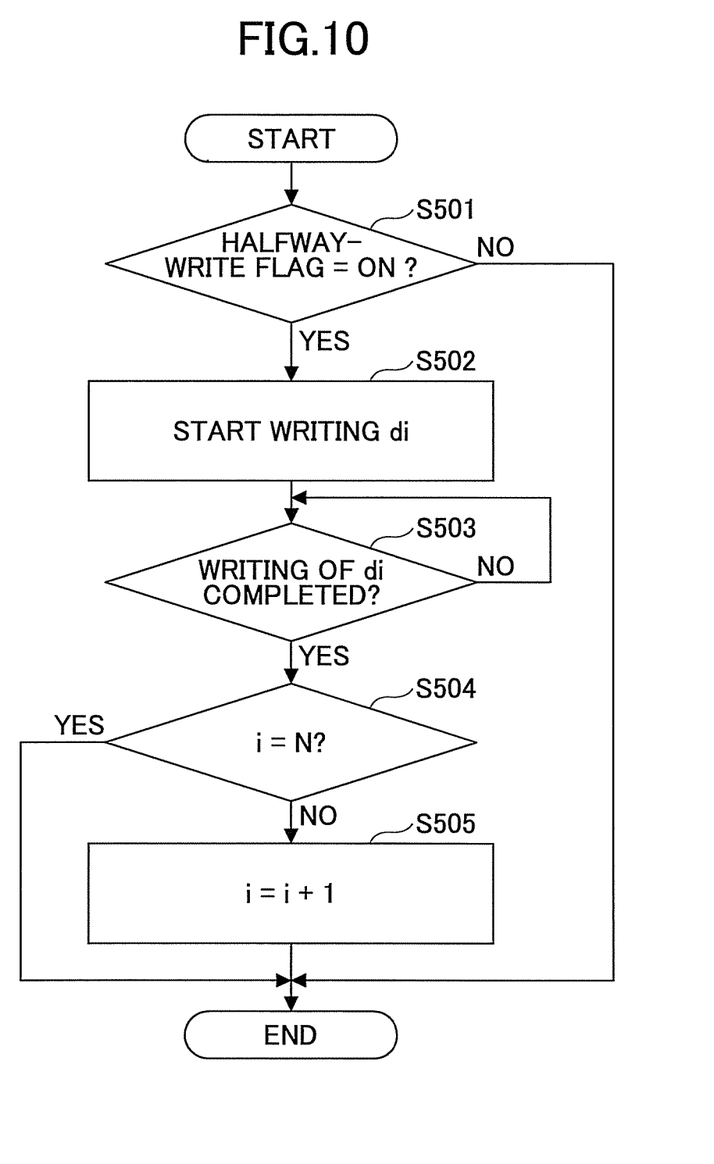
FIG. 10 is a flowchart illustrating a process of resuming data writing upon the resumption of power to the hard disk drive.

In this shutdown preparation process for the hard disc drive 5, the multifunctional machine 1 may check whether the total write data amount N in need of being written has already been written as illustrated in FIG. 9 and FIG. 10. Upon the resumption of power supply, a data write process for data that has not yet been written may be resumed to write the data to the hard disc drive 5.

Namely, the power control common logic R of the plugin CMP 32b for the memory device 33c checks whether the current write data di is being written as illustrated in FIG. 9 (step S401). In the case of the data being written, the power control common logic R waits until the writing of the write data di is completed (step S402). The power control common logic R then stops the write process (step S403).

Upon stopping the write process, the power control common logic R checks whether the current write data di is the last data of the total write data amount N, i.e., whether i is equal to N (step S404). In the case of i being equal to N, the power control common logic R ascertains that the writing of all data in need of being written has been completed, and completes the shutdown preparation process.

Upon detecting that i is not equal to N in step S404, i.e., detecting that the current write data di is not the end of the total write data amount N, the power control common logic R ascertains that the writing of all data in need of being written has not been completed with respect to the hard disc drive 5. In this case, the power control common logic R sets a halfway-write flag to ON. Moreover, the power control common logic R sets write restart data i equal to i+1 (i.e., i=i+1), and completes a shutdown preparation process (step S405). Here, the write restart data i indicates the data that should be written first at the time of write resumption.

Upon detecting that the current write data di is not being written in step S401, the power control common logic R immediately completes a shutdown process.

Upon resuming power supply to the hard disk drive, the power control common logic R checks whether the halfway-write flag is ON (step S501) as illustrated in FIG. 10. In the case of the halfway-write flag being OFF, the power control common logic R finishes the process based on the determination that there is no remaining data in need of being written.

Upon detecting that the halfway-write flag is ON in step S501, the power control common logic R ascertains that there is remaining data in need of being written. The power control common logic R refers to the write restart data i, and starts writing data di indicated by the write restart data i to the hard disc drive 5 (step S503). The power control common logic R then waits for the writing of the data di to come to an end (step S503). The power control common logic R then checks whether the current write data di is the last data of the total write data amount N, i.e., whether i is equal to N (step S504).

Upon detecting in step S504 that i is equal to N, the power control common logic R ascertains that the writing of all data in need of being written has been completed with respect to the hard disc drive 5, thereby immediately completing a data write resuming process. Upon detecting in step S504 that i is not equal to N, the power control common logic R ascertains that the writing of all data in need of being written has not been completed, and increments indicative of the current write data by "1" (i.e., i=i+1). The power control common logic R repeats the data write process as described above. Upon detecting that i is N in step S504, the power control common logic R ascertains that the writing of all data has been completed, thereby completing the process.

In the multifunctional machine 1 of the present embodiment described above, the platform PF serving as a basis for operations is provided with the power control core unit PFr that controls power supply to the devices 33a through 33e, which are caused to perform functions by the plugin CMPs 32ba through 32bn that are installed in the platform PF in an uninstallable manner. The power control core unit PFr transmits information about power control to the plugin CMPs 32ba through 32bn through the power-related interfaces (power control interfaces) Ia through In of the plugin interfaces PFia through PFin, respectively. The plugin CMPs 32ba through 32bn receive an advanced notice of power stoppage serving as power control information from the power-related interfaces Ia through In through the plugin interfaces (plugin-side power control interfaces) Pia through Pin, respectively. In response, the power control common logics R of the plugin CMPs 32ba through 32bn perform shutdown preparation processes (i.e., make shutdown preparations) with respect to the devices 33a through 33e, which are caused to perform functions by the plugin CMPs 32ba through 32bn. Further, the power control common logic R performs a power control process such as a resume process performed at the time of power supply resumption, and sends information about the results of the power control process to the power control core unit PFr. The power control core unit PFr then controls power supply based on the information about the results of processes sent from the plugin CMPs 32ba through 32bn.

Accordingly, when the main power switch of the multifunctional machine 1 is turned off, the main power is stopped after waiting until the shutdown preparations are properly made with respect to the engine 3, the operation unit 4, the hard disc drive 5, and the FCU 6, which are the devices 33a through 33e caused to operate by the plugin CMPs 32ba through 32bn. With this arrangement, the supply of the main power is properly turned off in a safe and controlled manner.

In the multifunctional machine 1 of the present embodiment, further, the plugin CMPs 32ba through 32bn receive an advanced notice of power stoppage from the power control unit 26. In response, the power control common logics R perform shutdown preparation processes that cause the devices 33a through 33e driven by these plugin CMPs 32ba through 32bn to be placed in the condition in which these devices can be safely shutdown. Upon completing the shutdown preparation processes, information about the completion of shutdown preparations is given to the power control common logics R as the information about the results of processes. Upon receiving the information about the completion of shutdown preparations from the plugin CMPs 32ba through 32bn, the power control common logics R stops supply of power to the devices 33a through 33e.

Accordingly, power supply can be stopped only after the devices 33a through 33e, which are caused to perform functions by the plugin CMPs 32ba through 32bn, are placed in a safe condition in which no damage is caused by the stoppage of power supply. This makes it possible to secure the safe operation of the multifunctional machine 1.

In the multifunctional machine 1 of the present embodiment, one of the devices 33a through 33e which are caused to perform functions by the plugin CMPs 32ba through 32bn may be the engine 3 (i.e., engine device 33a). In this case, a safe shutdown performable state is the state in which all the sheets are discharged from the engine 3 by the power control common logic R. Upon this shutdown performable state being achieved, the information indicative of the completion of shutdown preparations is given to the power control common logic R.

Accordingly, even when the main power is turned off while sheets are present in the sheet travel path inside the engine 3, the occurrence of paper jam or malfunction can be avoided. That is, the power supply to the engine 3 can be safely stopped. Specifically, this arrangement eliminates the need for a user to remove sheets remaining on the sheet travel path. Further, this arrangement can prevent fire that would be caused by the sheets remaining inside a device such as the fuser unit which may reach high temperature. In this manner, hardware is kept in safe, proper conditions while usability is improved.

In the multifunctional machine 1 of the present embodiment, further, one of the devices 33a through 33e which are caused to perform functions by the plugin CMPs 32ba through 32bn may be the engine 3 that employs an electrophotographic system. In this case, a safe shutdown performable state is the state in which the number of print media sheets for which fusing by the fuser unit is completed is equal to the number of sheets discharged onto a sheet receiving tray. Upon this shutdown performable state being achieved, the information indicative of the completion of shutdown preparations is given to the power control common logic R.

In the case of fees being required for printing at the multifunctional machine 1, it is ensured that all the fuse-completed sheets which are subject to a fee charge be available for the user to collect. In this manner, a fee charge for printing is properly performed, thereby improving usability. This arrangement also eliminates the need for a user to remove sheets from the sheet travel path, thereby placing the hardware in safe, proper conditions.

In the multifunctional machine 1 of the present embodiment, one of the devices 33a through 33e which are caused to perform functions by the plugin CMPs 32ba through 32bn may be the memory device 33c, which performs data write and data read with respect to the hard disc drive 5. In this case, a safe shutdown performable state is the state in which the writing of data currently being written is completed by the memory device 33c with respect to the hard disc drive 5. Upon this shutdown performable state being achieved, the information indicative of the completion of shutdown preparations is given to the power control common logic R.

This arrangement prevents the loss of data caused by turning off the main power during an ongoing write process, thereby ensuring the safety of data and improving usability.

In the multifunctional machine 1 of the present embodiment, there may be remaining data that follows the data for which writing to the hard disc drive 5 has been completed. In this case, a safe shutdown performable state is the state in which the write position of such remaining data is stored by the plugin CMP 32b for the memory device 33c. Upon this shutdown performable state being achieved for the hard disc drive 5, the information indicative of the completion of shutdown preparations is given to the power control common logic R.

Accordingly, the resumption of data writing upon the resumption of power supply ensures data integrity when the data is in such a data format that the data is invalid unless all the data are present. Unlike printing, data writing is hard for a user to notice. A write resume position may be recorded without canceling all the requests, thereby resuming the write process upon the resumption of power supply. This arrangement prevents data destruction, and ensures the completion of a write process, thereby improving usability.

In the multifunctional machine 1 of the present embodiment, the power control core unit PFr causes the display 4b of the operation unit 4 to show information indicative of an ongoing power shutdown process during the time between the advanced notice of power stoppage to the plugin CMPs 32ba through 32bn and the completion of power stoppage.

This arrangement notifies a user of an ongoing power shutdown process to prevent the user from performing unnecessary operations, thereby improving usability.

Further, the present invention is not limited to these embodiments, but various variations and modifications may be made without departing from the scope of the present invention.

The technology disclosed herein may be used for an image processing apparatus such as a multifunctional machine, a copier machine, and a printer to which plural plugins are connected to the platform, for the purpose of properly turning off the main power.

Further, the present invention is not limited to these embodiments, but various variations and modifications may be made without departing from the scope of the present invention.

The present application is based on Japanese priority application No. 2010-052644 filed on Mar. 10, 2010, with the Japanese Patent Office, the entire contents of which are hereby incorporated by reference.

What is claimed is:

1. An image processing apparatus, comprising: a platform serving as a basis for operations; and a plurality of plugins installed in the platform in an uninstallable manner to cause a plurality of devices to perform functions, wherein the platform includes: a power control unit to control supply of power to the devices; a first power control interface to transmit to the plugins an advanced notice of shutdown that is to be performed by the power control unit, wherein each of the plugins includes: a second power control interface to receive the advanced notice of shutdown from the first power control interface; and a power processing control unit to make a preparation for shutdown in response to the advanced notice of shutdown received through the second power control interface, and to send information about the preparation to the power control unit through the second power control interface, wherein the power control unit controls supply of power to at least one of the devices based on the information about the preparation received from at least one of the plugins, and wherein the plurality of plugins have a first plugin configured to cancel an ongoing function when the first plugin receives the advanced notice of shutdown, and a second plugin configured to restart another ongoing function after the supply of power is resumed when the second plugin receives the advanced notice of shutdown; wherein a given one of the plugins causes one of the devices to print an image on a print medium, and a shutdown performable state is a state in which the print medium is discharged from the one of the devices, and wherein the power processing control unit sends an indication of completion of the preparation as the information about the preparation to the power control unit upon the one of the devices being in the shutdown performable state; said image processing apparatus further comprising: a first counter to count a first number indicative of a number of print medium for which the fuse process is completed; and a second counter to count a second number indicative of a number of fuse-completed print medium which have been discharged to outside the image processing apparatus, wherein a given one of the plugins causes one of the devices to print an image on a print medium, to perform a fuse process on the print medium having the image printed thereon, and to discharge the fuse-completed print medium to outside the image processing apparatus, and a shutdown performable state is a state in which the first number matches the second number, and wherein the power processing control unit sends an indication of completion of the preparation as the information about the preparation to the power control unit upon the one of the devices being in the shutdown performable state.

2. The image processing apparatus as claimed in claim 1, wherein the power processing control unit of a given one of the plugin makes a preparation for shutdown by which one of the devices caused by the given one of the plugins to perform a function is placed in a shutdown performable state, and sends an indication of completion of the preparation as the information about the preparation to the power control unit, and wherein the power control unit stops the supply of power in response to receiving the indication of completion of the preparation from each of the plugins.

3. The image processing apparatus as claimed in claim 1, wherein a given one of the plugins causes one of the devices to write and read data with respect to a nonvolatile memory device for retaining the data during a power-off period, and a shutdown performable state is a state in which a writing of data currently being written is completed with respect to the nonvolatile memory device, and wherein the power processing control unit sends an indication of completion of the preparation as the information about the preparation to the power control unit upon the one of the devices being in the shutdown performable state.

4. The image processing apparatus as claimed in claim 3, wherein the shutdown performable state is also a state m which a write position of data next following the data, the writing of which has been completed with respect to the nonvolatile memory device, is recorded, and wherein the power processing control unit sends an indication of completion of the preparation as the information about the preparation to the power control unit upon the one of the devices being in the shutdown performable state.

5. The image processing apparatus as claimed in claim 1, further comprising a reporting unit, wherein the power control unit causes the reporting unit to keep presenting an indication of an ongoing shutdown process during a time between the transmitting of the advanced notice of shutdown to the plugins and the stopping of supply of power to the devices.

6. The image processing apparatus as claimed in claim 1, wherein the second plugin is further configured to set an indication that the ongoing function is not competed and to resume an incomplete ongoing function based on after the supply of power is resumed.

* * * * *